United States Patent [19]
Casey

[11] Patent Number: 5,878,043
[45] Date of Patent: Mar. 2, 1999

[54] ATM LAN EMULATION

[75] Inventor: Liam Maurice Casey, Ottawa, Canada

[73] Assignee: Northern Telecom Limited, Montreal, Canada

[21] Appl. No.: 644,082

[22] Filed: May 9, 1996

[51] Int. Cl.⁶ ........................................... H04L 12/44
[52] U.S. Cl. ................................. 370/397; 370/399
[58] Field of Search .......................... 370/402, 401, 370/465, 254, 253, 252, 395, 396, 397, 398, 399, 400, 409, 410

[56] References Cited

U.S. PATENT DOCUMENTS

| | | | |
|---|---|---|---|
| 4,901,312 | 2/1990 | Hui et al. | 370/85.12 |
| 5,329,527 | 7/1994 | Ujihashi et al. | 370/85.13 |
| 5,394,402 | 2/1995 | Ross | 370/94.1 |

FOREIGN PATENT DOCUMENTS

| | | | |
|---|---|---|---|
| 2269724 | 2/1994 | United Kingdom | H04L 12/56 |

OTHER PUBLICATIONS

Truong, Hong Linh, et al., "LAN Emulation on an ATM Network," 2460 IEEE Communications Magazine 33(1995) May, No. 5, New York, US, pp. 70–85, May 1995.

Truong, H.L., "LAN Emulation on an ATM Network", IEEE Communications Magazine, vol. 33, No. 5, May 1995, N.Y., U.S.

"LAN Emulation Over ATM: Draft Specification—Revision 7" ATM Forum/94–0035R7, ATM Forum Technical Committee, LAN Emulation Sub-working Group, Oct. 7, 1994.

*Primary Examiner*—Huy D. Vu

[57] ABSTRACT

By using a LAN emulation in an ATM environment, end systems such as workstations etc. can connect to the ATM network while software applications interact as if they are attached to a traditional LAN. The invention is a simple technique for emulating a LAN on an ATM network. According to the invention, each end system is identified by hub and port identifiers which represent a hub and a port of the hub to which the end system is connected. By labelling each ATM cell, and proper label translation at hubs, a LAN can be emulated without using network servers which would introduce cumbersome extra procedures.

9 Claims, 9 Drawing Sheets

VCI: Virtual Channel Identifier
VPI: Virtual Path Identifier
UNI: User Network Interface
NNI: Node-to-Node Interface
HEC: Header Error Control
GFC: Generic Flow Contyrol
PTI: Payloead Type Identifier
CLP: Cell Loss Priority

ATM LAN EMULATION

FIELD OF THE INVENTION

The present invention is directed to an ATM network. In particular, it is directed to a LAN (local area network) emulation in the ATM network or networks.

BACKGROUND OF THE INVENTION

A LAN is a digital communications network interconnecting several local computer workstations through a shared medium. It is also possible to connect two or more LANs. The communication network interconnecting remote LANs is referred to generally as a WAN (wide area network). In one form, a WAN is a network containing some switching mechanism to which each LAN is connected by a bridge. In another form, a WAN is a simple point-to-point link for interconnection of only two remote LANs.

U.S. Pat. No. 4,901,312, issued Feb. 13, 1990 to Hui et al describes remote interconnection of LANs by a virtual or pseudo ring formed in a WAN by e.g., a packet switching network.

U.S. Pat. No. 5,329,527, issued Jul. 12, 1994 to Ujihashi et al describes a system in which two or more LANs are interconnected by way of an ATM network by respective bridges to effect communication between terminals. In the system of the patent, each bridge has an address table for local terminals and a second table containing logical connection identifiers to other bridges and addresses of remote terminals connected to other bridges.

An ATM service called "LAN emulation" that emulates services of existing LANs across an ATM network allows the use of the vast base of existing LAN application software. By using such a service, end systems (e.g. workstations, servers, bridges, etc.) can connect to the ATM network while the software applications interact as if they are attached to a traditional LAN.

There are several advantages that a LAN emulation based on ATM (or other switching technologies) has over a true shared medium LAN. A LAN emulation:

- breaks geographical limitations on the separation of stations participating on the same LAN segment, in particular when a station is moved to a new location within the same enterprise it could remain in the same LAN segment;
- can accommodate many more stations on the same LAN segment; and
- can be partitioned into LAN segments based upon functional requirements, not geographical proximity.

The ATM Forum is defining a technology of emulating shared media LAN segments on ATM networks. It regards the LAN emulation as important for both accommodating existing LAN-based protocols on ATM stations and for providing connectivity between ATM stations and stations on "legacy" LANs. The architecture underpinning the ATM Forum's effort is based upon servers. For example, a server provides address resolution, i.e. obtaining the ATM address representing the station with a particular address, and a multicast server handles multicast traffic. A station can also open a point-to-point VCC (virtual channel connection) to another station once it has found its ATM address. Besides a direct data transfer through a VCC, the source can also make use of a data forwarder server. A server station sends packets to the data forwarder server when it does not know the destination's ATM address. The data forwarder server re-transmits the packets to the alternate destination.

Separate VCCs are needed to each of these servers, and each requires its own packet format. Thus, an attempt to send a short packet to a hitherto unused address can result in ten or more ATM level transactions. Also, when a station swaps between using the data forwarder service and a point-to-point connection, there is a risk that its packets will arrive out of order. Since mis-ordering does not occur in shared media LAN segments, the ATM Forum is proposing an extra protocol to flush one path before the other is used.

Servers are notoriously difficult to engineer; they have a high start-up cost for small systems and they don't scale well. The present invention simplifies greatly a LAN emulation over an ATM network without the use of servers and will help wide acceptance of ATM networks to integrate existing LANs.

OBJECTS OF THE INVENTION

It is therefore an object of the present invention to provide a novel technique to emulate a LAN across an ATM network.

It is another object of the present invention to provide a novel technique to emulate a LAN across an ATM network without the use of servers.

It is a further object of the invention to provide a novel technique by which the address field of ATM cells are translated so that the identity of a source station is readily available to a destination station.

SUMMARY OF THE INVENTION

Briefly stated, the invention is directed to an ATM network in which a plurality of end stations form one or more emulated LANs by way of one or more ATM hubs connected in a plurality of LAN configurations. In the ATM network, each end station is assigned with a hub identifier and a port identifier, the hub and port identifiers representing respectively an ATM hub and a port of the ATM hub to which the end station is connected. The ATM network of the invention further includes a control device at the ATM hub for identifying one of the emulated LANs by the hub and port identifiers of the connected end station, and a routing device for completing the VPI field of an ATM cell header, depending upon the emulated LAN identified by the control device. The ATM network includes yet a translation device for translating the VCI field of the ATM cell header from Hd and Pd to Hs and Ps, respectively, where Hd and Pd are the hub and port identifiers of a destination end station and Hs and Ps are the hub and port identifiers of a source end station.

According to another aspect, the invention is directed to a method of emulating one or more LANs in an ATM network among a plurality of end stations by way of one or more ATM hubs connected in a plurality of LAN configurations. The method comprises steps of assigning each end station with a hub identifier and a port identifier, the hub and port identifiers, representing respectively an ATM hub and a port of the ATM hub to which the end station is connected and identifying one of the emulated LANs by the hub and port identifiers of the connected end station the method further includes steps of completing the VPI field of an ATM cell header, depending upon the emulated LAN identified by the control device and translating the VCI field of the ATM cell header from Hd and Pd to Hs and Ps, respectively, where Hd and Pd are the hub and port identifiers of a destination end station and Hs and Ps are the hub and port identifiers of a source end station.

DETAILED DESCRIPTION OF THE PREFERRED EMBODIMENTS OF THE INVENTION

From the point of view of LAN emulation, an ATM network consists of a number of end systems, called stations, connected by access links to ATM switching hubs. ATM switching hubs may be known by other names such as access node, access switch, or first level switch, but "ATM switching hub" is chosen here to emphasize the placement in an enterprise network similar to that of other hubs serving a limited grouping of end-user stations. The access ports of the ATM switching hub offer the ATM UNI (user network interface) services to an attached station. A hub may also have a number of trunk ports. Trunks are ATM links that connect the hub with other hubs and/or to other ATM switches in an ATM backbone network.

An emulated LAN is hereinafter called a VLAN (Virtual LAN) or, when an emulated LAN is partitioned into segments, each emulated LAN segment is also called VLAN. While most stations will participate in a single VLAN, there is no restriction on the number of VLANs to which a station has access. Stations acting as bridges or routers will generally participate in several VLANs through the same ATM connection.

Generally speaking, VLANs are not quite plug and play: some administration activity is needed to assign a station to a particular VLAN. However, once initial administration has been performed, a station can be moved within an enterprise without further administrative work.

Figure 1:
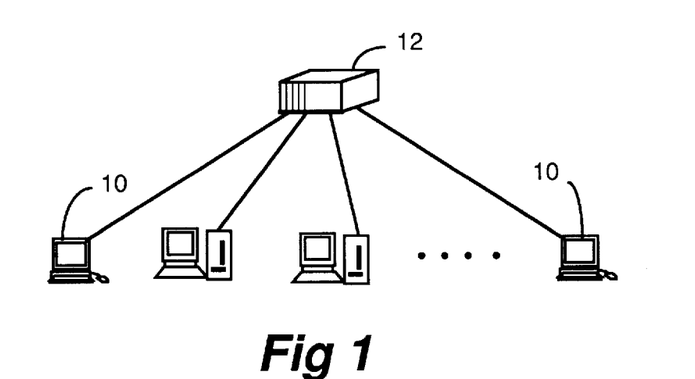
FIGS. 1–3 show different configurations which an ATM network may take, depending upon the presence of hubs and an ATM backbone network.
Figure 2:
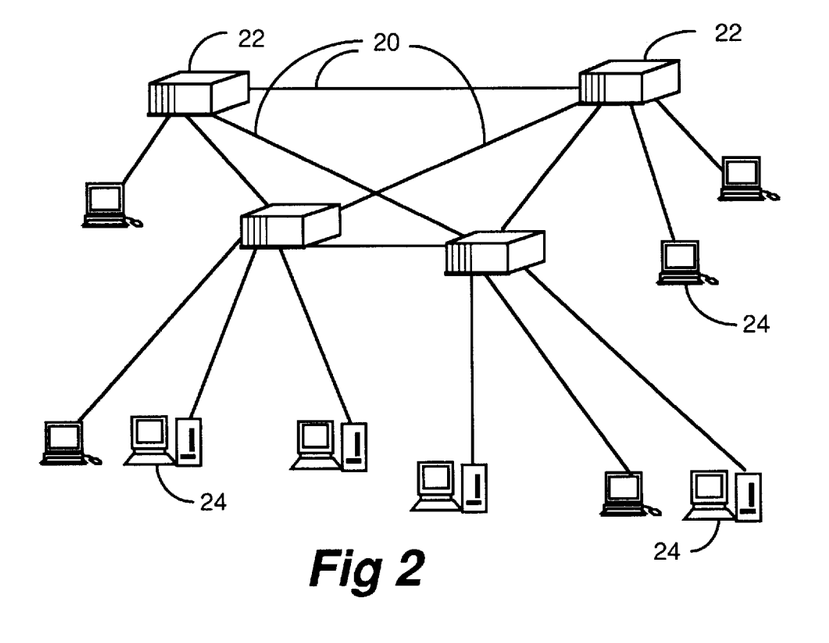
Figure 3:
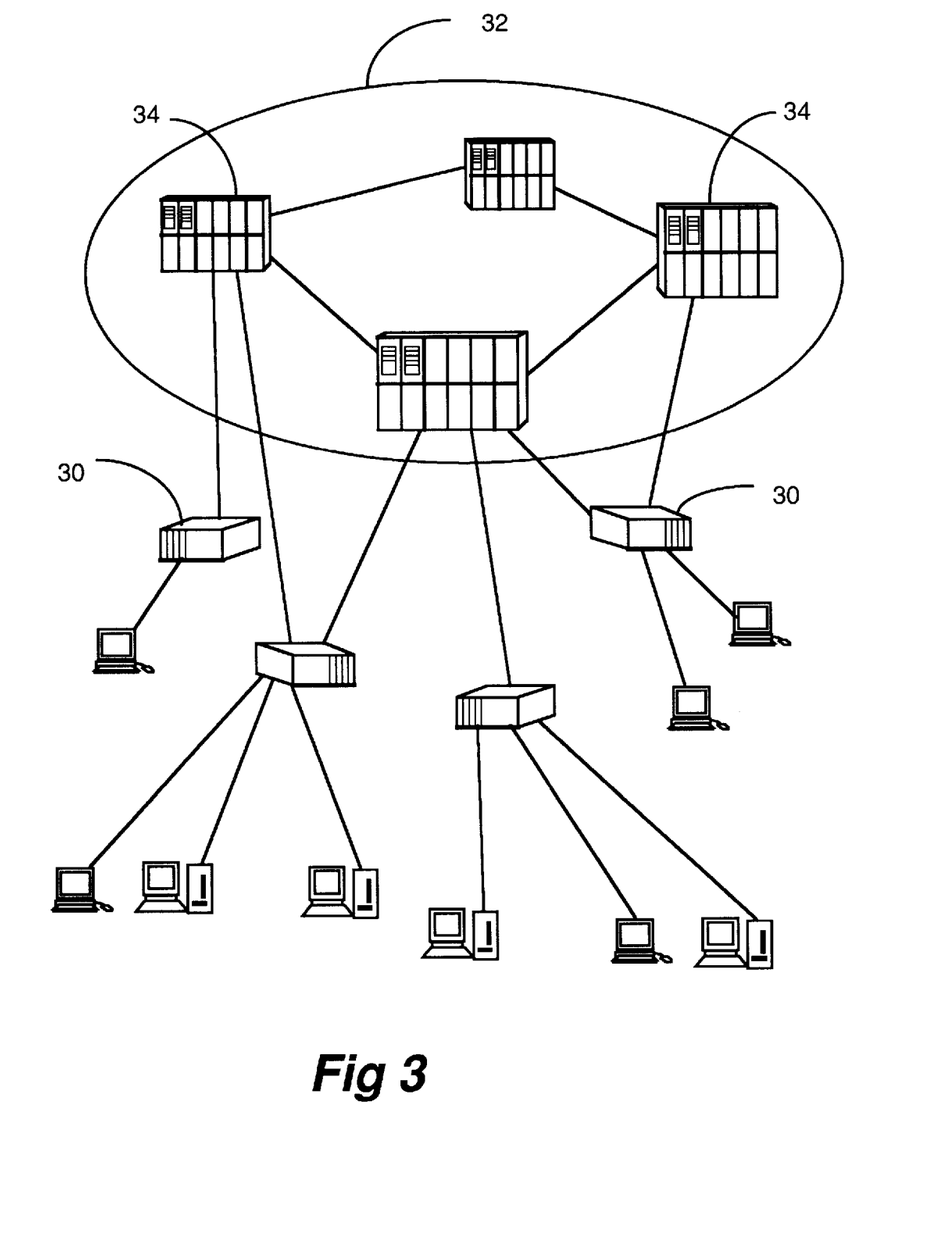

In FIGS. 1–3 are depicted, respectively, three general network configurations for emulated LANs. FIG. 1 shows a single hub configuration in which one or more relatively small VLANs containing end stations 10 can be emulated by way of an ATM hub 12.

FIG. 2 is another configuration in which direct trunks 20 between ATM hubs 22 will be sufficient to emulate moderate sized VLANs, spanning a local or campus areas and involving end stations 24. In FIG. 3, ATM hubs 30 are connected together via an ATM backbone network 32 in yet another configuration. In this last configuration, the geographical extent of the backbone network is not limited, usually consisting of more than one ATM backbone switch 34. In particular, it can be envisaged that stations half the world away can be part of a VLAN using public network ATM facilities.

Hybrids of the configurations shown in FIGS. 2 and 3 are also possible, with some hubs interconnected directly and some through the ATM backbone network.

Figure 4:
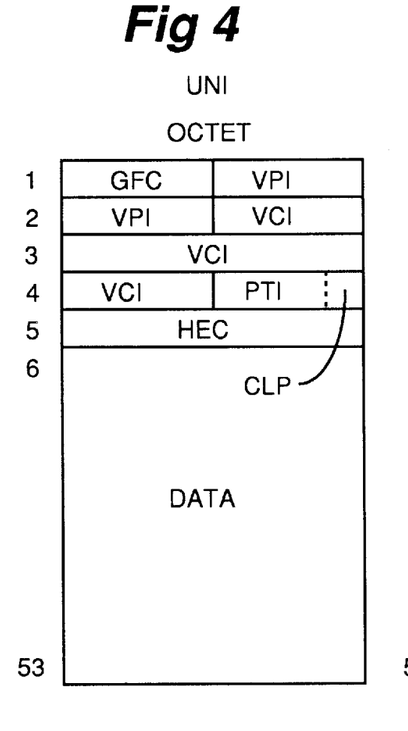
FIGS. 4 and 5 are ATM cell formats for UNI (user network interface) and NNI (node-to-node interface).
Figure 5:
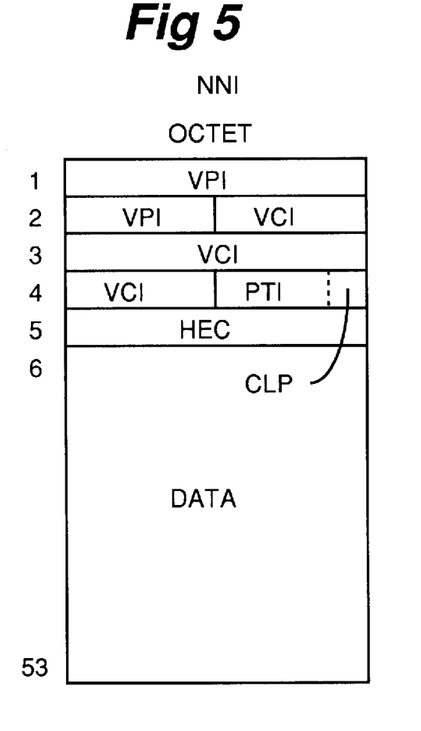

FIGS. 4 and 5 are ATM cell formats for UNI and NNI (node-to-node interface), both of which include a cell header and payload. The cell header is 5 bytes long and contains various fields, of which a routing field consists of two parts: VPI (virtual path identifier) and VCI (virtual channel identifier). At the UNI (e.g. between stations and hubs), the VPI is an 8-bit field, while on the trunks between network nodes (i.e. at the NNI) the VPI is a 12-bit field. In both interfaces, the VCI is 16 bits. In general ATM, all VCI (and where used, VPI) values are available for use on all links. For example, a station can have 64K different VCCs (virtual channel connections) on the link to a hub for each of 256 VPIs. Also, in general, VP/VCI values on one link are unrelated to those on other links because they are locally administered values.

In ATM, cell switching is controlled by VPI and VCI values. When a cell arrives on a link at a port, a translation process is executed. Based on the VPI and VCI values in the header of the cell, the output port for the cells is determined, as is a new VP/VCI. According to the invention, VP/VCIs can be set up in an ATM network in such a way that there is a direct (implicit) connection between every source and destination in the emulated LAN. The VP/VCI seen by every end station (source) to any particular (destination) end station is the same. The single VP/VCI that identifies a station can be associated directly with a MAC (media access control) address - avoiding any need to use ATM layer addresses. With an implicit connection being point-to-point, there is no extra delay in forwarding packets. Since it is the only way to transfer data, there is no need for the complex (Q.2931) connection setup protocol to be implemented in every station, nor is there any need for making provision for out-of-order packets. With the proposed mechanism, good scaling would be automatic and no special engineering rules will be required.

The tag on a cell is split into a VPI and a VCI part to support the virtual path concept. However, independent of their designation of virtual paths, VPI values also serve to partition address spaces. Not all switches support virtual paths directly but it is safe to assume that they do take note of VPI values in their translation process. According to the invention, VPI values are used to distinguish between separate VLANs realized on the same ATM network.

VP/VCI values on cells also serve at the destination as a key for de-multiplexing the incoming cell stream. Unlike a conventional shared medium LAN, an ATM LAN packet does not necessarily arrive at a destination as a contiguous unit; cells from different packets may be interleaved. If AAL-5 (ATM adaptation layer-5 protocol) is to be used to encapsulate LAN packets, then cells from different sources must arrive tagged with different VP/VCI values in order that each LAN packet can be reassembled correctly.

Every hub in a network is assigned (by administration) a unique short identifier: hub number. Each access port in a hub is also assigned a number: port number.

For VLAN operation of the invention, the VCI value on an access link is considered to consist of 2 parts: a hub number and a port number. For simplicity of exposition, assume that each is 8 bits, but such a constraint is not necessary in reality. With this organization a maximum sized VLAN can have 256 hubs, each with 256 access ports, supporting a total of 64K stations.

In a further embodiment, an ATM network supports many VLANs of this size. VPI values are used at the UNI for distinguishing between different VLANs when a station has access to more than one of them. It is anticipated, however, that the capability to support multiple VLANs will be used to partition users into smaller functional groups, each with its own VLAN. In practice, this is preferred to putting an entire enterprise on one maximally sized VLAN.

Every station attached to a VLAN can be identified by its access hub number and port number. The essence of the serverless LAN emulation scheme of the invention is that the cells of all packets for a particular destination at a port identified by port number Pd on a hub identified by hub number Hd be sent from any source with a VCI of [Hd,Pd]. The VP/VCI translation at every hub in the VLAN has to be organized such that the cell is forwarded towards port Pd on hub Hd. Thus there is a VCC between each pair of stations in a VLAN.

As noted above, according to the invention, cells arriving at a destination from different sources should have different VP/VCI values. The invention requires that the VP/VCI translation performed at the destination hub is such that the final VCI value of a cell at a destination station is [Hs,Ps], where Hs is the identifier of the hub and Ps the identifier of the port of the hub to which the source of the cell is connected. Thus each cell, when it arrives at the destination, identifies its source.

Figure 6:
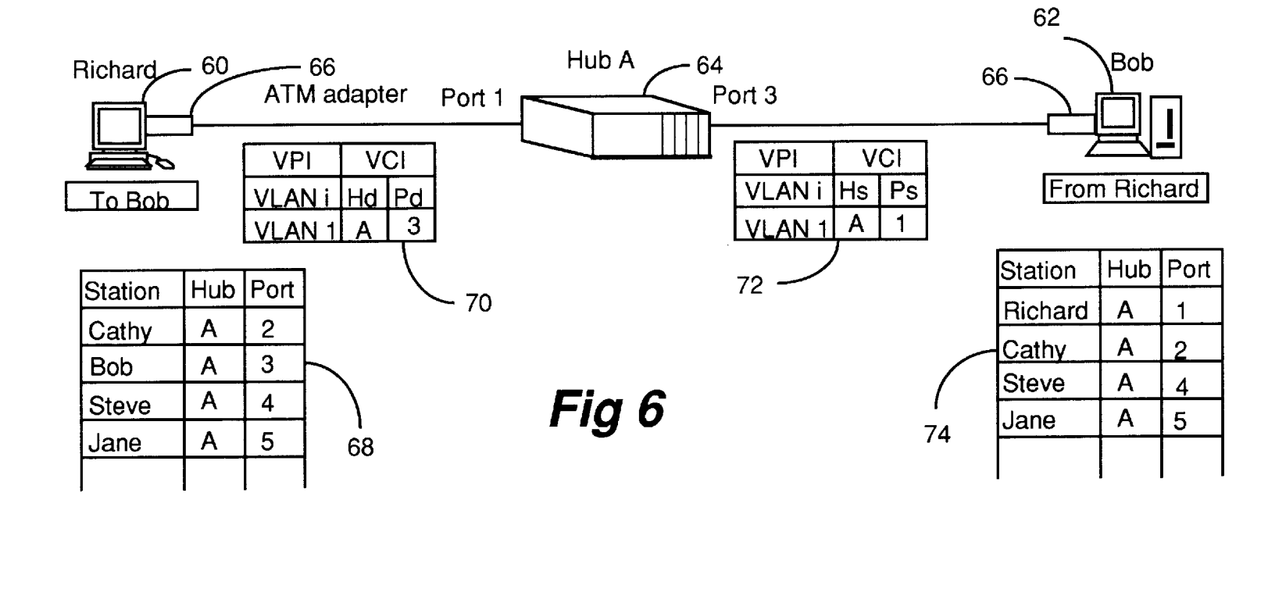
FIGS. 6–8 are schematic illustrations of translation mechanisms for different configurations according to embodiments of the invention.
Figure 7:
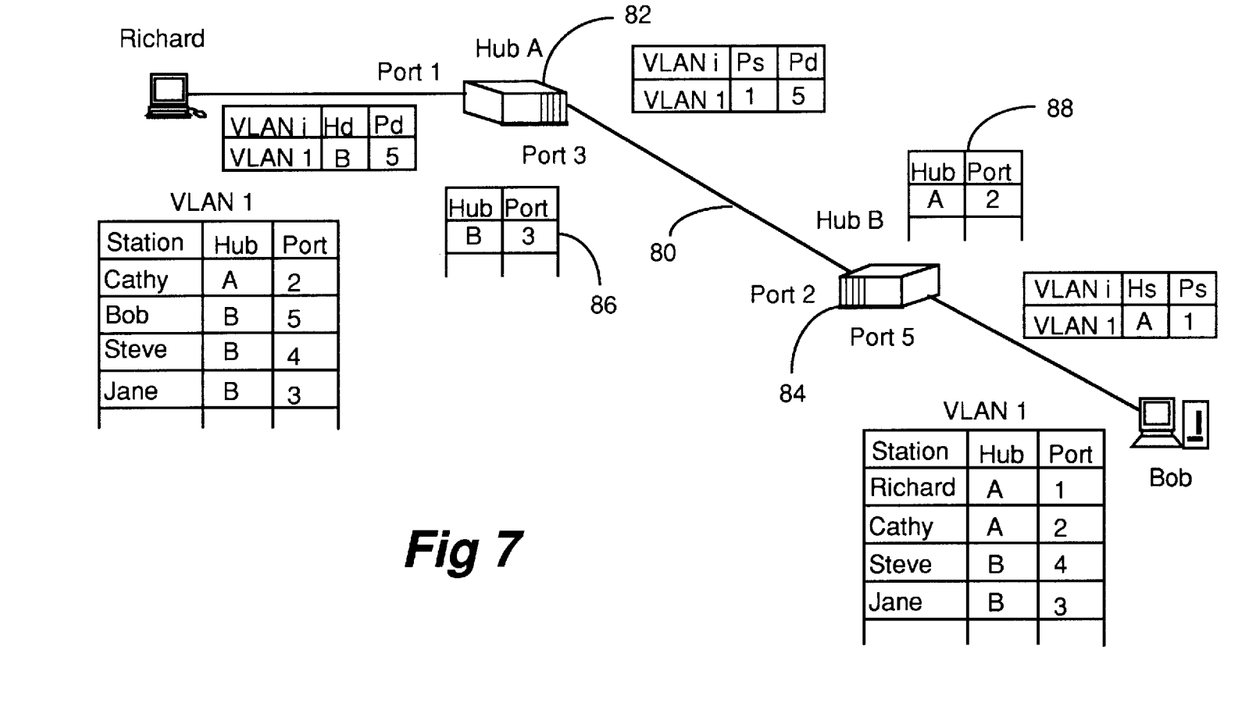
Figure 8:
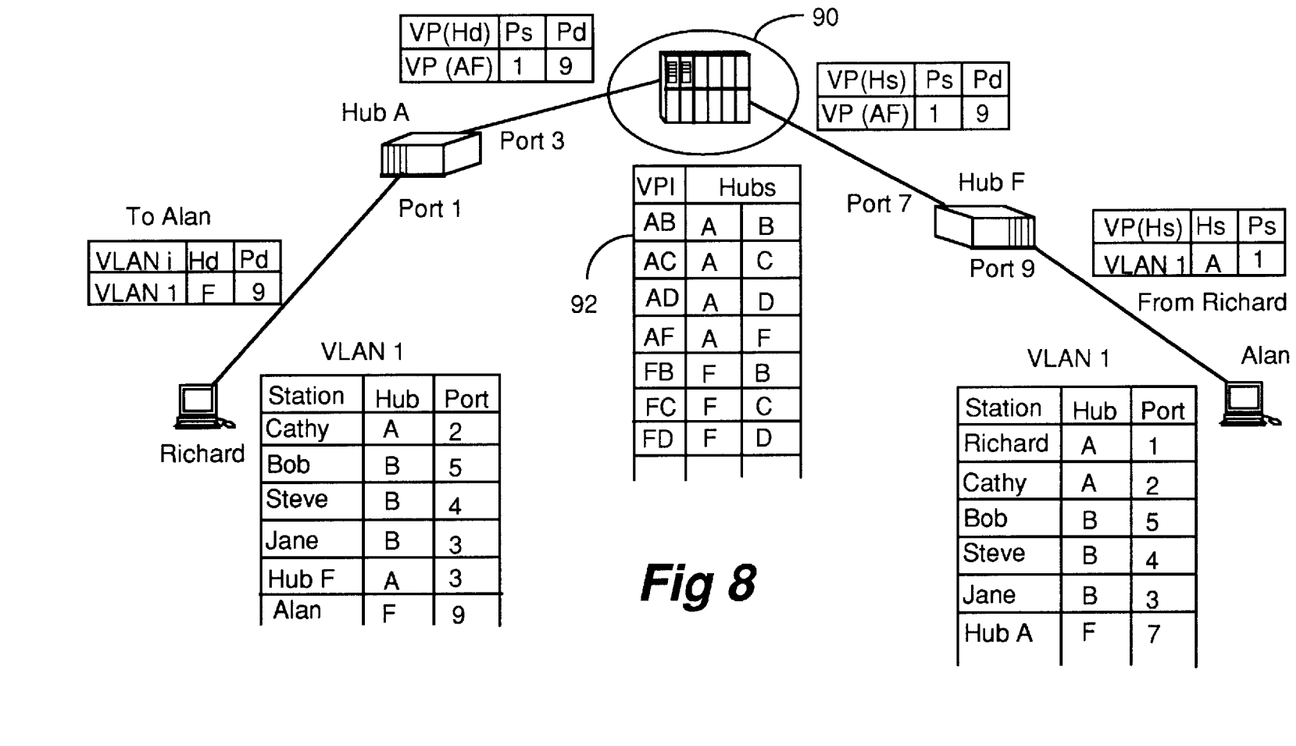

FIGS. 6–8 illustrate the translation process performed at ATM switching hubs for each of the configurations described above with reference to FIGS. 1–3. A single VLAN (i.e. a single emulated LAN segment) is identified at all participating stations by the VPI value VLANi, i being a positive integer. The translations involved in directing a cell from a source station on port Ps of hub Hs to a destination station on port Pd of hub Hd are also shown.

FIG. 6 illustrates two end stations 60 and 62 connected by an ATM hub 64 as in the configuration shown in FIG. 1. Each station has an ATM adapter 66. An end station 60 (e.g. Richard) directs his data to Bob of VLAN 1. By referring to an address table 68, an ATM adapter formulates each ATM cell 70 by setting its VPI field to VLAN 1 and VCI (Hub/Port) to A/3. The address table 68 is shown for illustration purposes only. The end stations have many ways of translating names to LAN addresses. There being a single hub in this configuration, Hd=Hs and the translation process at the input port Ps identifies Pd as the output port and alters the VP/VCI values of the ATM cell 72.

[VLANi/Hd;Pd] to [VLANi/Hs;Ps]

that is to say,

[VLAN 1/A;3] to [VLAN 1/A;1].

If it needs to, the end station Bob can easily identify the source station as Richard from the address table 74.

Referring to FIG. 7, there is a direct link 80 between hubs A (Hs) 82 and B (Hd) 84, set up by connection tables 86 and 88. The translation at the source port Ps at hub Hs identifies the trunk to Hd as the output port and alters the cell VP/VCI values:

[VLANi/Hd;Pd] to [VLANi/Ps;Pd].

Therefore, in FIG. 7, the translation is

[VLAN 1/B;5] to [VLAN 1/1;5], and hub A directs the cell to its own port 3 by referring to the connection table 86. At the destination hub Hd, the translation process carried out at the trunk input port inserts the identity of the hub at the other end of the trunk link (i.e. Hs) into the VCI field as shown below and directs the cell to port Pd:

[VLANi/Ps;Pd] to [VLANi/Hs;Ps].

In the embodiment of the Figure, the translation is

[VLAN 1/1;5] to [VLAN 1/A;1] because hub B knows from its translation table 88 that cells arriving on port 2 are from hub A.

FIG. 8 shows a connection in the configuration shown in FIG. 3. In this embodiment, it is assumed that a permanent virtual path exists between each pair of hubs in the VLAN (when two hubs are part of more than one VLAN, a separate virtual path is needed for each VLAN that they have in common). These virtual paths are stored in a table at each hub identified by a VPI value. Other than the ability to carry virtual paths, no special capabilities are required by switches in the ATM backbone network 90. At the first hub, hub A (Hs), the VPI of the virtual path to the destination hub, VP(Hd), is retrieved from a table 92 and cells are forwarded to the trunk port that carries that virtual path. The VP/VCI field is changed as shown below:

[VLANi/Hd;Pd] through VP to [VP(Hd)/Ps;Pd].

In the embodiment shown in the Figure the translation therefore is,

[VLAN 1/F;9] to [VP(AF)/1;9].

It is a characteristic of virtual paths that the VCI field of a cell is not altered as it travels along it. The VPI field will in general be altered, it is supposed that its value on the last link incoming to the destination hub is VP(Hs). The translation process uses VP(Hs) to retrieve the VLANi and Hs values needed for the final VP/VCI (shown below) for cells which are then forwarded to port Pd:

[VP(Hs)/Ps;Pd] to [VLANi/Hs;Ps].

In the particular embodiment in the Figure, this translation is:

[VP(AF)/1;9] to [VLAN 1/A;1].

All of the above translation processes could be achieved by administratively setting up standard ATM switch translation tables for all ports of all hubs. Therefore, according to a further embodiment, modified translation hardware in the hubs (not in any backbone switches) could perform translations with much reduced table space requirements. One would partition the VPI space so that a range of VPI values would trigger the special VLAN style of VP/VCI translation processing.

Figure 9:
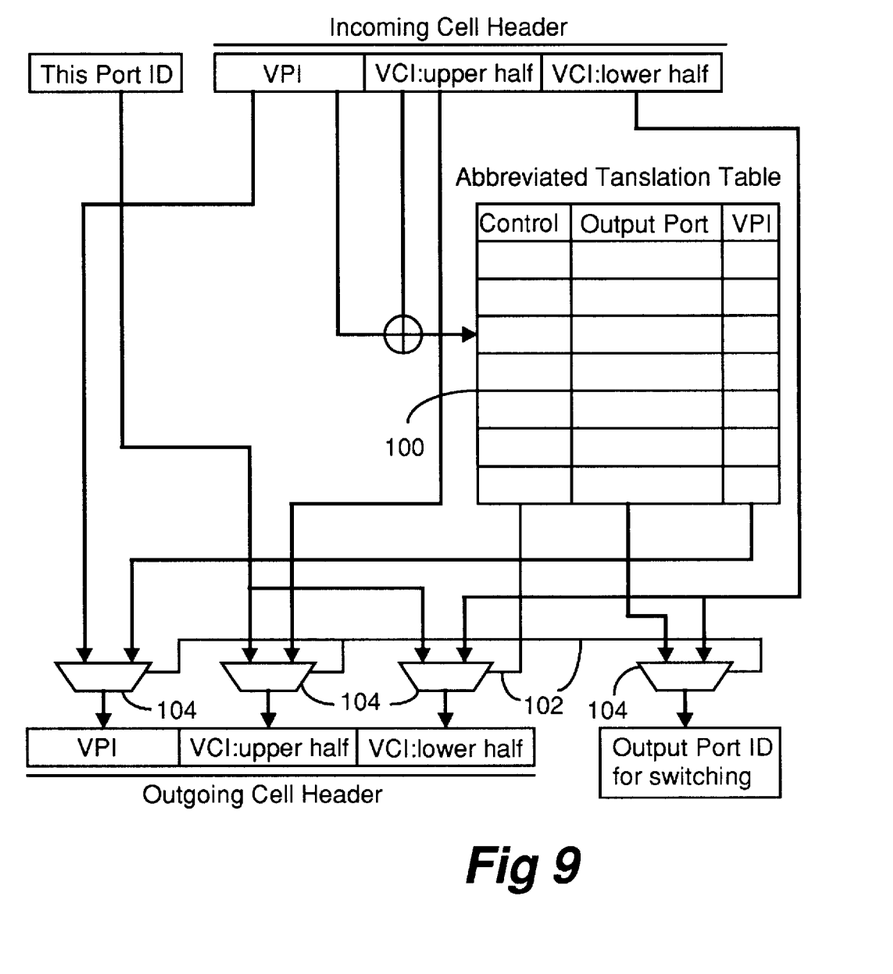
FIG. 9–11 are schematic illustrations of translation mechanisms in detail.

For example, FIG. 9 is a schematic chart of a translation function on a hub at a station input port. There are three possible configurations as shown in FIGS. 6, 7 and 8. A translation table 100 gives a control output of 4 bit vector at 102; one bit controls each of the 4 multiplexers 104. In FIG. 9, supposing that a multiplexer chooses the left input at the control bit=0 and the right input at the control bit=1, the corresponding vectors for multiplexers for three possible configurations are as follows:

Destination Hub=This Hub (FIG. 6) 0101
Direct trunk to Destination Hub (FIG. 7) 0010
Virtual Path to Destination Hub (FIG. 8) 1010

Referring specifically to FIGS. 6 and 9, when hub A receives a cell with the header [VLANI/A;3] from Richard, it refers to the translation table which finds that the destination belongs to the same hub and produces a (0101) vector. Under the control of this vector, multiplexers generate the outgoing cell's header as follows:

VPI=same as VPI of the incoming cell header;
VCI (upper half)=VCI (upper half) of the incoming cell header;
VCI (lower half)=the port ID of hub A at which the cell arrived;
output port ID=VCI (lower half) of the incoming cell header.

The output port ID (=3) is used by hub A to switch the cell from port 1 to port 3.

Figure 10:
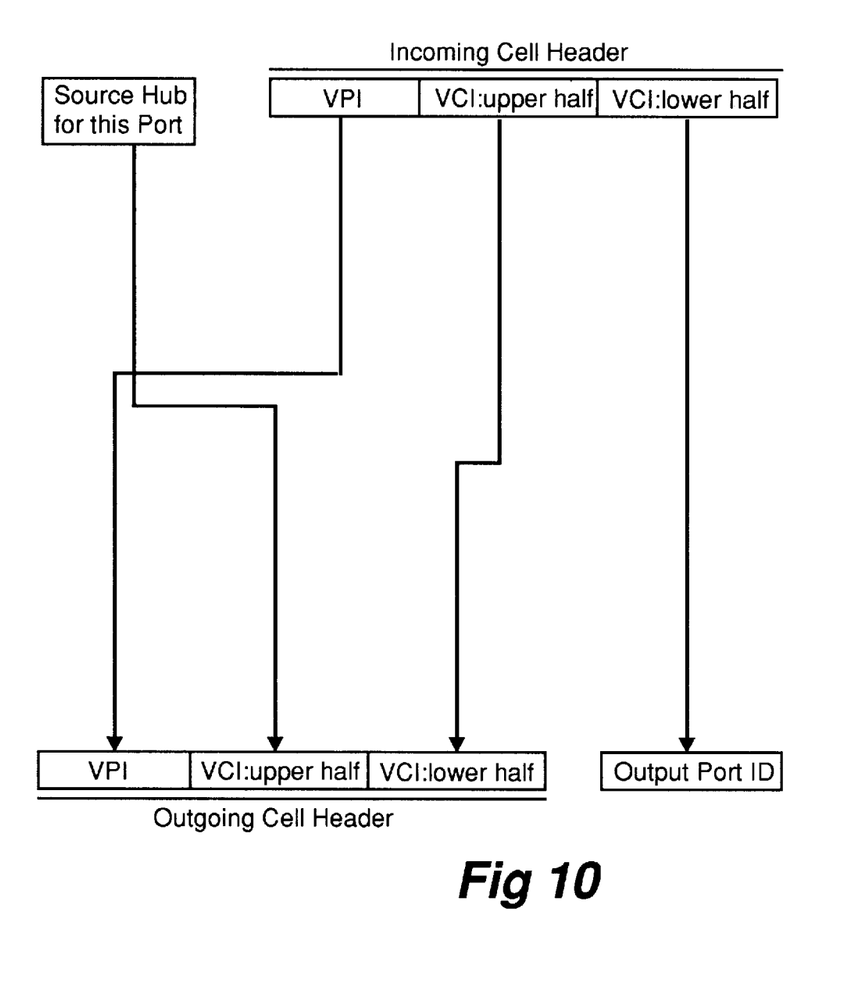
Figure 11:
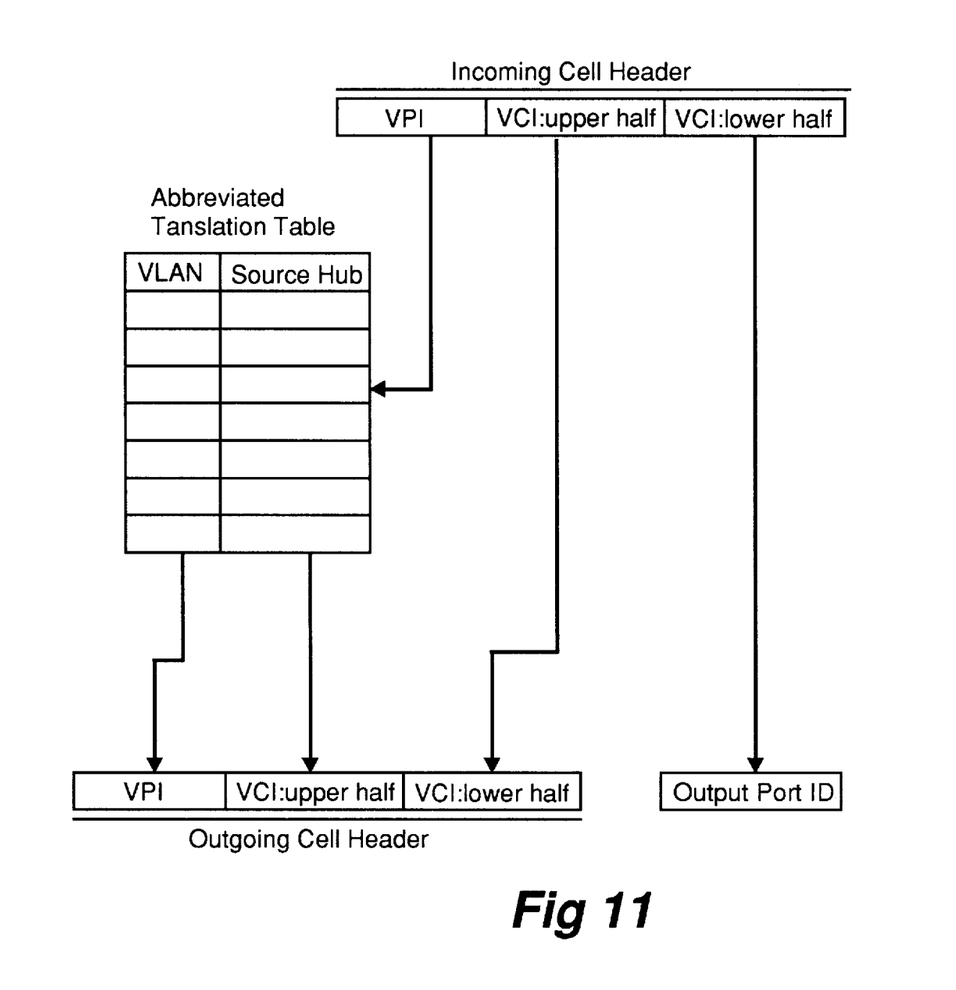

Similar translations are performed at the station input port of hub A in the configurations shown in FIG. 7 and 8 under appropriate control vectors. For example, FIG. 10 shows the arrangement for a direct trunk input port as in the configuration shown in FIG. 7. Similarly, FIG. 11 shows the arrangement for the input port that terminates a virtual path to a hub. This is the configuration shown in FIG. 8. In FIGS. 10 and 11, connections are shown without multiplexers which actually makes these connections under control of the control vectors.

While the translation table is shown as being indexed by the concatenation of VPI and upper half of VCI, alternative arrangements with two layers of indexing would give more compact tables.

As described in detail above, in the present invention the hub number/port number pair designates the same station no matter where on a VLAN it is used and therefore it can be considered a locally administered LAN address. Even if globally unique 48-bit MAC addresses are desired (and they certainly simplify TCP/IP administration), neither ATM addresses for stations are needed, nor is there any need for Q.2931 setup. An ARP (address resolution protocol) service can reply directly with the hub number/port number pair VCI value for the specified MAC addresses.

What is claimed is:

1. An ATM network in which a plurality of end stations form one or more emulated LANs by way of one or more ATM hubs connected in a plurality of LAN configurations, comprising:

each end station being assigned with a hub identifier and a port identifier, the hub and port identifiers representing respectively an ATM hub and a port of the ATM hub to which the end station is connected;

a control device at the ATM hub for identifying one of the emulated LANs by the hub and port identifiers of the connected end station;

a routing device for completing the VPI field of an ATM cell header, depending upon the emulated LAN identified by the control device; and a translation device for translating the VCI field of the ATM cell header from and Pd Hs, respectively, where Hd and Pd are the hub and port identifiers of a destination end station.

2. The ATM network, according to claim 1, in which one or more ATM hubs are connected by trunks dedicated to one or more emulated LANs.

3. The ATM network, according to claim 2, in which the control device produces a control signal and the translation device includes multiplexers for converting values in VPI field and VCI field of the ATM cell header in response to the control signal.

4. The ATM network, according to claim 3, further comprising translation tables for identifying one or more emulated LANs and referring to hub and port identifiers of end stations.

5. The ATM network, according to claim 3, in which the translation device includes multiplexers for converting values in VPI field and VCI field of the ATM cell header in response to the control signal and the value in the VPI field.

6. A method of emulating one or more LANs in an ATM network among a plurality of end stations by way of one or more ATM hubs connected in a plurality of LAN configurations, comprising steps of:

assigning each end station with a hub identifier and a port identifier, the hub and port identifiers, representing respectively an ATM hub and a port of the ATM hub to which the end station is connected;

identifying one of the emulated LANs by the hub and port identifiers of the connected end station;

completing the VPI field of an ATM cell header, depending upon the emulated LAN identified by the control device; and translating the VCI field of the ATM cell header from Hd and Pd to Hs and Ps respectively, where Hd and Pd are the hub and port identifiers of a destination end station.

7. The method of emulating one or more LANs in an ATM network among a plurality of end stations, according to claim 6, wherein the step of completing includes a further step of inserting a virtual LAN identifier in the VPI field of an ATM cell header.

8. The method of emulating one or more LANs in an ATM network among a plurality of end stations according to claim 7, in which the translation step includes a step of referring to a translation table which identifies one or more emulated LANs, and the hub and port identifiers of end stations.

9. The method of emulating one or more LANs in an ATM network among a plurality of end stations according to claim 7, in which the translation step includes a step of multiplexing hub and port identifiers in the VCI field.

* * * * *